Dec. 22, 1959           E. J. HARRIS           2,918,105

SERVICING MACHINE FOR PNEUMATIC TIRE BUILDING MACHINERY

Filed Nov. 24, 1954           7 Sheets-Sheet 1

FIG. I

INVENTOR.
EDWARD J. HARRIS

BY
*J. William Freeman*
ATTORNEY

INVENTOR.
EDWARD J. HARRIS
BY
G. William Freeman
ATTORNEY

INVENTOR.
EDWARD J. HARRIS
BY
J. William Freeman
ATTORNEY

Dec. 22, 1959         E. J. HARRIS         2,918,105
SERVICING MACHINE FOR PNEUMATIC TIRE BUILDING MACHINERY
Filed Nov. 24, 1954                                 7 Sheets-Sheet 5

INVENTOR.
EDWARD J. HARRIS
BY
*L. William Freeman*
ATTORNEY

Dec. 22, 1959  E. J. HARRIS  2,918,105
SERVICING MACHINE FOR PNEUMATIC TIRE BUILDING MACHINERY
Filed Nov. 24, 1954  7 Sheets-Sheet 6

INVENTOR.
EDWARD J. HARRIS
BY
J. William Freeman
ATTORNEY

Dec. 22, 1959     E. J. HARRIS     2,918,105
SERVICING MACHINE FOR PNEUMATIC TIRE BUILDING MACHINERY
Filed Nov. 24, 1954     7 Sheets-Sheet 7
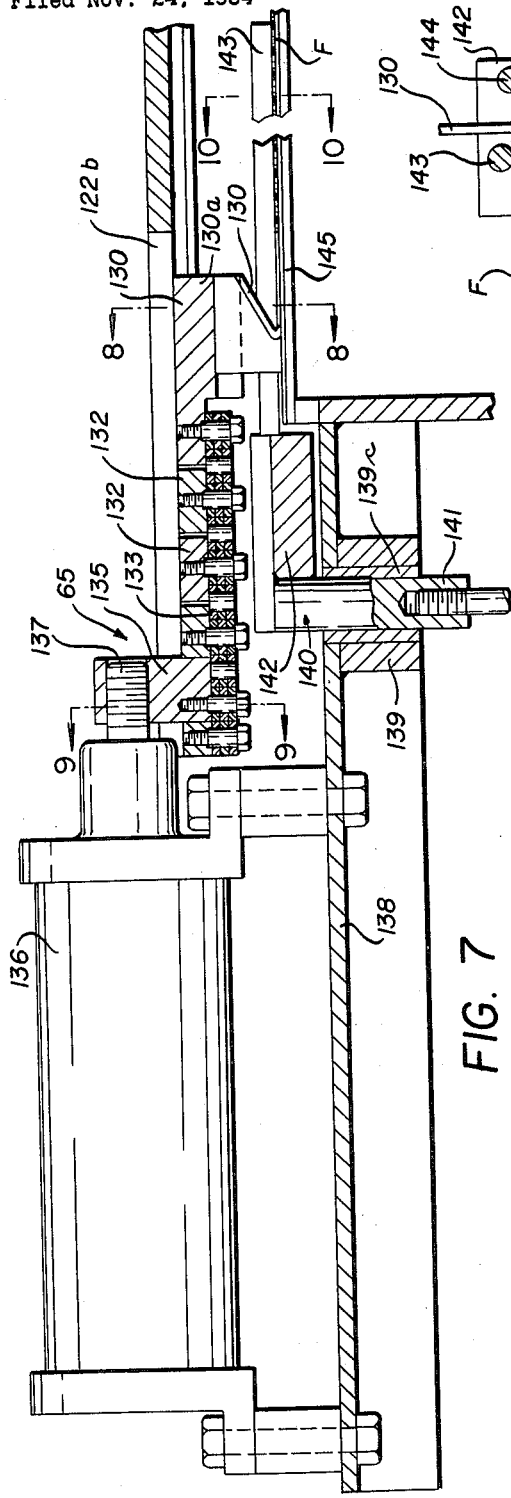
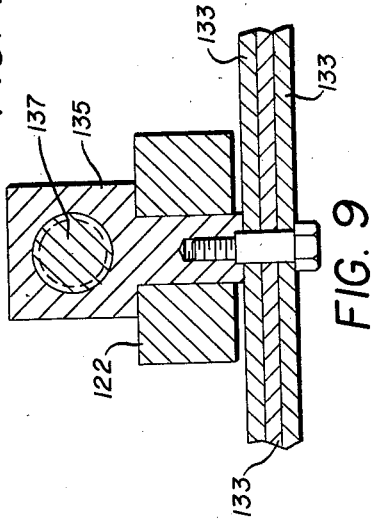
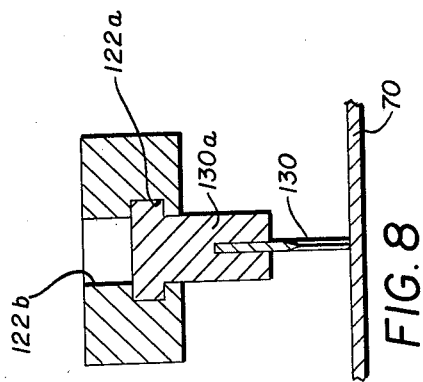
INVENTOR.
EDWARD J. HARRIS
BY
*J. William Freeman*
ATTORNEY 2,918,105
Patented Dec. 22, 1959

2,918,105

SERVICING MACHINE FOR PNEUMATIC TIRE BUILDING MACHINERY

Edward J. Harris, Akron, Ohio, assignor, by mesne assignments to The Cleveland Trust Company, Cleveland, Ohio, as trustee Application November 24, 1954, Serial No. 470,918

11 Claims. (Cl. 154—10)

This invention relates to pneumatic tire construction, and in particular, relates to apparatus for efficiently supplying fabric plies to the building form of a pneumatic tire machine.

As is well known in the prior art, the building of a pneumatic tire involves the building up of a plurality of fabric plies on an annular building form, followed by a "shaping" operation that forms the "green" tire casing into a toroidal shape for subsequent vulcanization into a finished product.

In the past, the application of the fabric plies around the usual building form has been a somewhat difficult operation in the overall pneumatic tire construction, due to the fact that the structural requirements of a pneumatic tire dictate that the successive plies of the tire must be provided with cord members that are angularly disposed with respect to each other. Thus, the first fabric applied to the building form will be provided with cord elements that extend transversely of the fabric ply at a bias angle ranging between 40° and 50°. The next fabric ply will have the cord elements thereof angularly disposed with respect to the cord elements of the first fabric by approximately 80° to 100°, while the cord elements of the third applied fabric ply will parallel the cord elements of the first applied fabric ply.

To compensate for this structural requirement in pneumatic tire manufacture, there have been developed in the past, certain types of servicing equipment that in essence, comprised a plurality of stock rolls that were mechanically arranged so as to dispense fabric ply stock in accordance with the above requirements. In the main, these servicing devices of the known prior art included a turret-type arrangement wherein a plurality of stock rolls, having cord element disposed therein at the bias angle required, were rotated about a vertical axis, the arrangement being such that one ply could be fed to the building form and applied thereto; and upon completion of this operation the turret could be revolved a quarter revolution, for example, to present a fabric stock roll that had the bias angle of the cord elements thereof disposed with respect to that of the first applied fabric ply.

While the above type of equipment has functioned with a certain degree of satisfaction in the construction of pneumatic tires to this date, it has been discovered that the construction and maintenance of the conventional turret equipment provided therein is expensive in nature and excessive with regard to the space and loading requirements therefor. Further disadvantage in this known type of prior art resides in the fact that such equipment is, at the present time, devoid of any dispensing apparatus that will cause a predetermined longitudinal length of fabric stock to be withdrawn from the same. The importance of such a function becomes manifest when it is considered that the prior art at this time contemplates the manual severance of a longitudinal length of fabric stock after a manual withdrawing of the stock. Such manual operation is, at best time consuming; and further, has been found to result in inaccuracies due to the fact that successively applied lengths of fabric plies, in addition to having alternately disposed cord elements, must further be successively increased in length to provide an increased circumference that is accurately receivable over the previously applied length of fabric ply. At the present time, these manual operations render difficult the consistent degree of accuracy required in volume production.

Accordingly, it is one object of this invention to provide a servicing machine for pneumatic tire building equipment that has improved fabric stock carrying mechanisms.

It is a further object of this invention to provide an improved servicing device for pneumatic tire equipment, including improved feed means for dispensing predetermined lengths of fabric stock from stock carrying units.

It is a still further object of this invention to provide an improved servicing machine for the construction of pneumatic tires, including improved fabric ply feeding means for dispensing predetermined lengths of fabric stock from stock carrying units, and further characterized by the presence of indexing means whereby said ply feeding means can dispense successively, increasing lengths of fabric stock.

These and other objects of the invention will become more apparent upon a reading of the following specification, considered in the light of the accompanying drawings.

Of the drawings:

Figure 7 is a vertical section taken through the cutoff means employed in the ply feeding mechanism.

Figures 8, 9 and 10 are sections taken respectively, on the lines 8—8, 9—9 and 10—10 of Figure 7.

Figure 1:
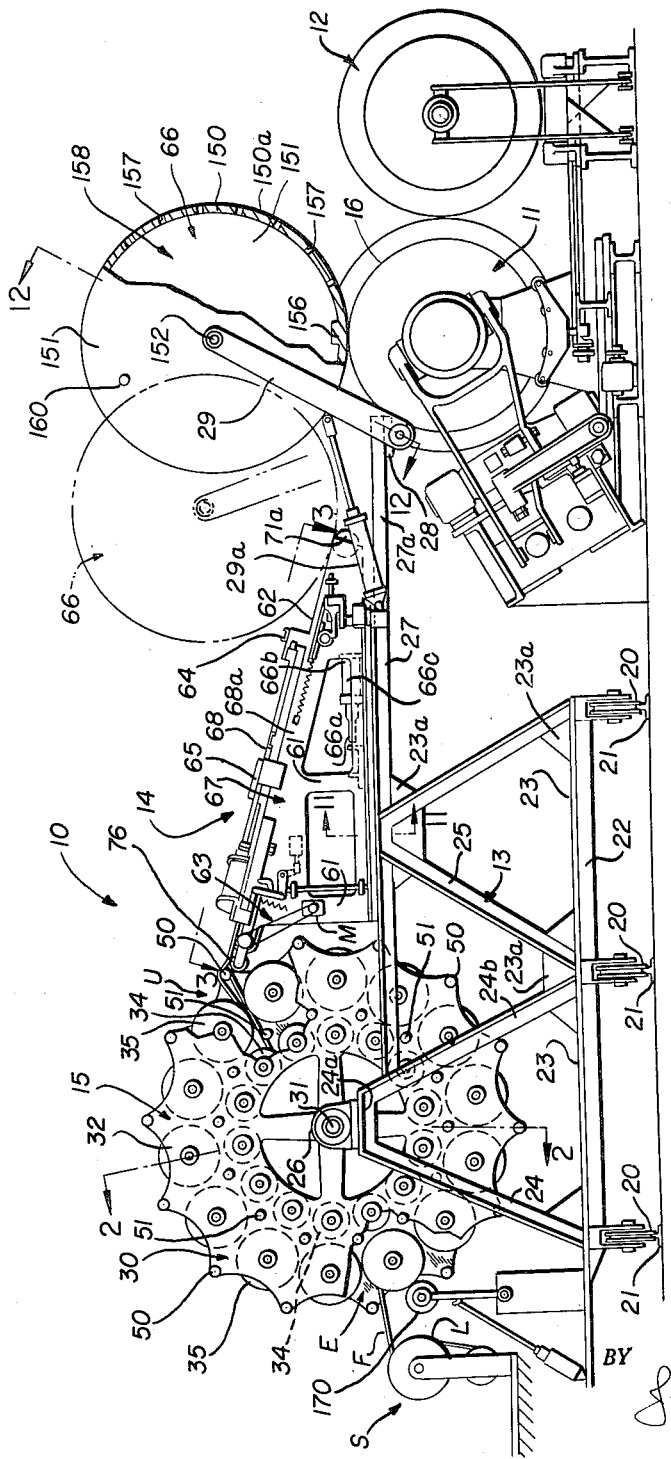
Figure 1 is a side elevation illustrating the servicer positioned adjacent a pneumatic tire building machine.
Figure 12:
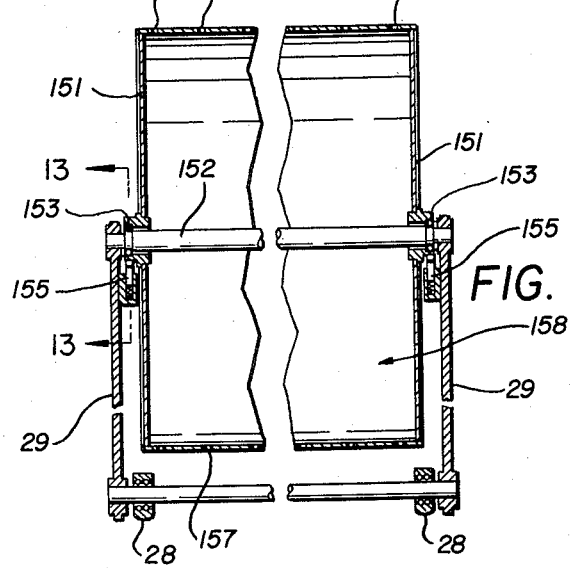
Figure 11:
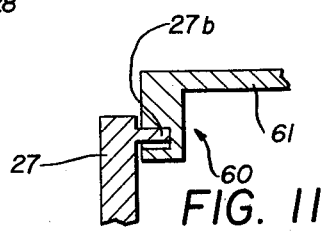

Figures 11 and 12 are sections taken respectively, on the lines 11—11 and 12—12 of Figure 1.

Figure 13:
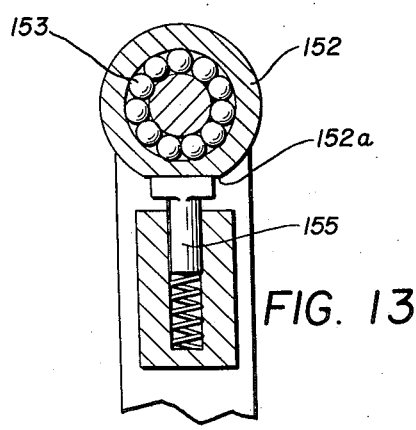

Figure 13 is a section taken on the lines 13—13 of Figure 12.

Referring now to the drawings, and in particular, to Figure 1 thereof, the improved servicer, generally designated as 10, is shown positioned adjacent one side of the pneumatic tire machine 11 that is equipped with bead setting apparatus 12 adjacent the opposed edge thereof. The servicer 10 is carried on a frame 13, and is so arranged that a ply feeding mechanism 14 withdraws a predetermined length of fabric ply stock F from a stock carrying unit 15 for subsequent application to the external surface of a building form 16 of the tire machine 11, in a manner to be described.

In order that a better understanding of the overall servicer 10 may be obtained, the structural characteristics of the component elements thereof will be individually described, followed by a description of the operation of the overall servicer 10.

Description of frame

As best illustrated in Figure 1, the servicer 10 is mounted on a frame 13, that is shiftable axially of the tire machine 11 through the use of wheels 20, 20 that ride on guide tracks 21, 21. The frame 13 is shown having a rectangular base 22 defined by the usual structural members 23, 23 and serving as a platform support for triangular-shaped frame members 24 and 25 that respectively support the stock carrying unit 15 and the ply feeding mechanism 14; it being understood that the usual structural plates 23a, 23a are employed throughout to add rigidity to frame 13.

Figure 2:
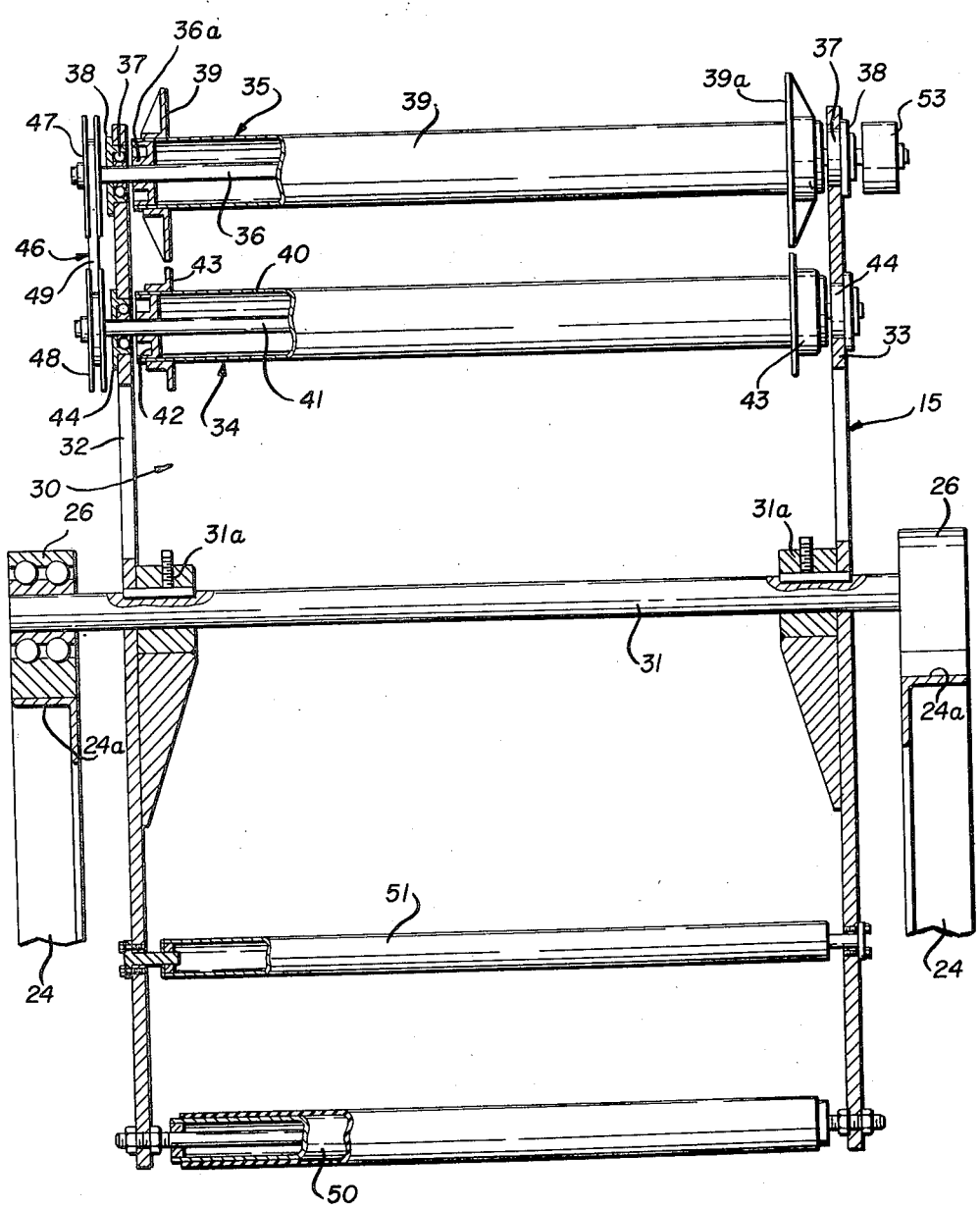
Figure 2 is a section taken on the lines 2—2 of Figure 1.

Referring now to Figure 2 of the drawings, the stock carrying unit 15 is shown supported with respect to the frame member 24 through the use of roller bearings 26, 26 that are mounted on a platform 24a provided adjacent the apex of the triangular frame member 24, which bearings are further designed to receive the opposed axial ends of the stock carrying unit 15, in a manner to be described. By like token, the ply feeding mechanism 14 is shown supported with respect to the frame 13 by a bed frame 27 that is mounted between the triangular frame member 25 and one side leg 24b of the frame 24, the arrangement being such that the ply feeding mechanism 14 may shift longitudinally of the bed frame 27. Similarly, the free outboard end 27a of the bed frame 27 is shown as including a trunnion 28 that serves to receive a link arm 29 leading to a component element of the ply feeding mechanism 14; the actuation of the link 29 about the trunnion 28 being effectuated through the use of a hydraulic piston 29a that has the opposed axial ends thereof interconnected between the link 29 and the bed frame 27.

*Description of stock carrying unit*

The stock carrying unit 15 is illustrated as including a wheel shaped circular support 30 that has a central hub defined by an axially extending shaft 31, the opposed free ends of which are journaled in the bearings 26, 26 in rotatable relationship therewith (see Figure 2). This support 30 includes a pair of substantially circular side plates 32 and 33 that are mounted, through bearings 31a, 31a in axially spaced condition on the shaft 31, so as to provide points of support for the axial ends of two sets of stock rolls 34, 34 and 35, 35 that are respectively arranged in two circular courses about the shaft 31; the rolls 34, 34 being illustrated as being disposed between the rolls 35, 35 and the axis of the shaft 31. In this manner a supply of fabric ply F can be carried by the rolls 35, 35, while the liner L thereof can be received on rolls 34, 34 upon dispensing of fabric ply to the ply feeding mechanism 14 in a manner to be described.

To this end each roll 35 is illustrated as including a central shaft 36 that has the axially spaced ends thereof journaled in ball bearing units 37, 37 that are respectively secured to plates 32 and 33, the usual end plates 38, 38 being employed in this regard to obviate axial thrust of the shaft 36 with respect to the plates 32 and 33. As best illustrated in Figure 2, a stock cylinder 39 is supported about the shaft 36 through radial flanges 36a, 36a, while additional flanges 39a, 39a are provided at axially spaced points on the cylinder 39, so that fabric ply-F having a separate liner L may be accurately received thereon.

The construction of each liner roll 34 is similar to the just described construction of the rolls 35, 35 and accordingly, each roll 34 includes a cylinder 40, spaced about a shaft 41 by radial flanges 42, 42 and including additional radial flanges 43, 43 that align liner material L received about the cylinder 40. As before, the shaft 41 is supported with respect to plates 32 and 33 through interconnecting roller bearings 44, 44.

The function of the stock carrying unit 15 dictates that the rotation of the adjacent rolls 34 and 35 be controlled so that one roll 35 will take up any liner material dispensed from the adjacent roll 35 when the same is rotated to dispense fabric ply F to the ply feeding mechanism 14.

Accordingly, this controlled rotation between adjacent rolls 34 and 35 is shown effectuated by the use of the watchspring-type connection 46 interconnecting the adjacent rolls 34 and 35, and including sheaves 47 and 48 that are respectively mounted on shafts 36 and 41 and are further illustrated as being interconnected by a steel tape 49; the arrangement being such that counter-clockwise rotation of the roll 35 (see Figure 1) will result in clockwise rotation of the roll 34.

For the purpose of guiding the liner L in its path of movement between adjacent rolls 34 and 35 during loading and unloading of the stock carrying unit 15, the same (unit 15) is provided with two circular courses of idler rolls 50, 50 and 51, 51 that are respectively disposed radially outside and radially inside the circular course of the axes of the rolls 35, 35 (see Figure 1). In this manner, fabric stock F, rolled about the cylinder 39 of stock roll 35 will be dispensed, together with the liner L from the underside of the roll 35 when the same (roll 35) is positioned in the unloading zone U of Figure 1. This dispensing of the fabric ply F, together with the liner L will result in clock-wise rotation of the stock roll 35, and the combined fabric ply F and liner L will be played out and over the idler roll 50. At this point, the fabric ply F is separated from the liner L by a splitter guide 55 carried on the ply feeding mechanism 14. At this point, the fabric ply F is delivered to the ply feeding mechanism 14, in a manner to be described; while the liner L moves rearwardly over the idler roll 51 for reception on the stock roll 34, the steel tape 49 aiding to wind up the stock roll 34 during this period of dispensing.

In addition to the unloading station U just mentioned, the stock carrying unit 15 includes a loading station E that is arcuately disposed about the periphery of the circular support 30. With this arrangement, the support 30 may be rotated about the pivot point defined by the roller bearings 26, 26, as a result of the use of indexing means (not shown) which operate to rotationally advance adjacent rolls 35, 35 through the loading and unloading stations E and U respectively; it being understood that the indexing means include provision for selectively positioning any one roll 35 at any point of its circular course of movement.

While the circular support 30 is rotated about its axis by the indexing means in the manner just described, requisite rotational movement between the adjacent rolls 34 and 35 is initiated by independent actuating means that operate to initiate reversed rotational movement of the stock roll 35 in the loading and unloading stations E and U respectively. To this end, the stock roll 35 is shown initiated in counter-clockwise movement in the unloading station U of Figure 1, as a result of contact between the idler roll 50 and a friction wheel 76 provided on the ply feeding mechanism 14. This counter-clockwise movement will result in dispensing of fabric ply to the ply feeding mechanism 14 and will further operate to wind up the dispensed liner L on the stock roll 34, as has been described. By like token, when an empty stock roll 35 is positioned in the loading station L of Figure 1, an independent friction wheel (not shown) will operate to engage a driving wheel 53 provided on one free end of the shaft 36 (see Figure 2). As a result of this driving engagement between the friction wheel and the driving wheel 53, the roll 35, when positioned in the loading station E of Figure 1, will rotate in clockwise direction with the result that fabric ply F from an independent source will be wound onto the roll 35, while liner material L, having been accumulated on roll 34 will be simultaneously fed to the stock roll 35 so that the same may be employed to separate successive layers of fabric supplied to the roll 35. In addition to serving as a driving means for winding fabric ply F onto the stock roll 35 during the period that the same is in the loading station E, the driving wheel 53 may also be employed to rewind any loose ends of fabric ply severed by the ply feeding mechanism 14 upon engagement with appropriate driving means (not shown) that are provided adjacent the unloading station U. In this manner, the free ends of the fabric ply F may be rewound onto the stock roll 35 after the same has been indexed from the unloading station U.

Description of ply feeding mechanism

As previously indicated, fabric stock F carried on the rolls 35, 35 of the stock carrying unit 15, is dispensed to the building form 16 of the pneumatic tire machine 11 through the medium of the ply feeding mechanism 14 that is disposed intermediate the machine 11 and the unit 15. In essence, this mechanism 14 includes a carriage 60 defined by a rectangular base 61 that is shiftable longitudinally of the bed frame 27 so as to move an endless conveyor 62 and the driving means 63 therefor, into and out of engagement with the idler roll 50 of the stock carrying unit 15. Fabric ply F received on the conveyor 62 is measured and subsequently cut off into predetermined longitudinal lengths through the combined action of measuring means 64, cutoff means 65, and a transfer drum 66 that coact to perform this function, in a manner to be described.

To this end, the rectangular base 61 of the carriage 60 is shown, in Figures 1 and 11, as being received on slides 27b, 27b of the bed frame 27 so as to be slidable with respect thereto upon operation of a piston 66c, having the opposed ends 66a, 66b thereof, respectively secured to the bed frame 27 and the carriage 60; the piston being expanded when it is desired to move the driving means 63 into contact with the idler roll 50.

The carriage frame 60 is further defined by a triangular framework 67, the inclined surface 68 of which serves as a guide frame 68a, for the conveyor 62, the measuring means 64 and the cut-off means 65.

Figure 3:
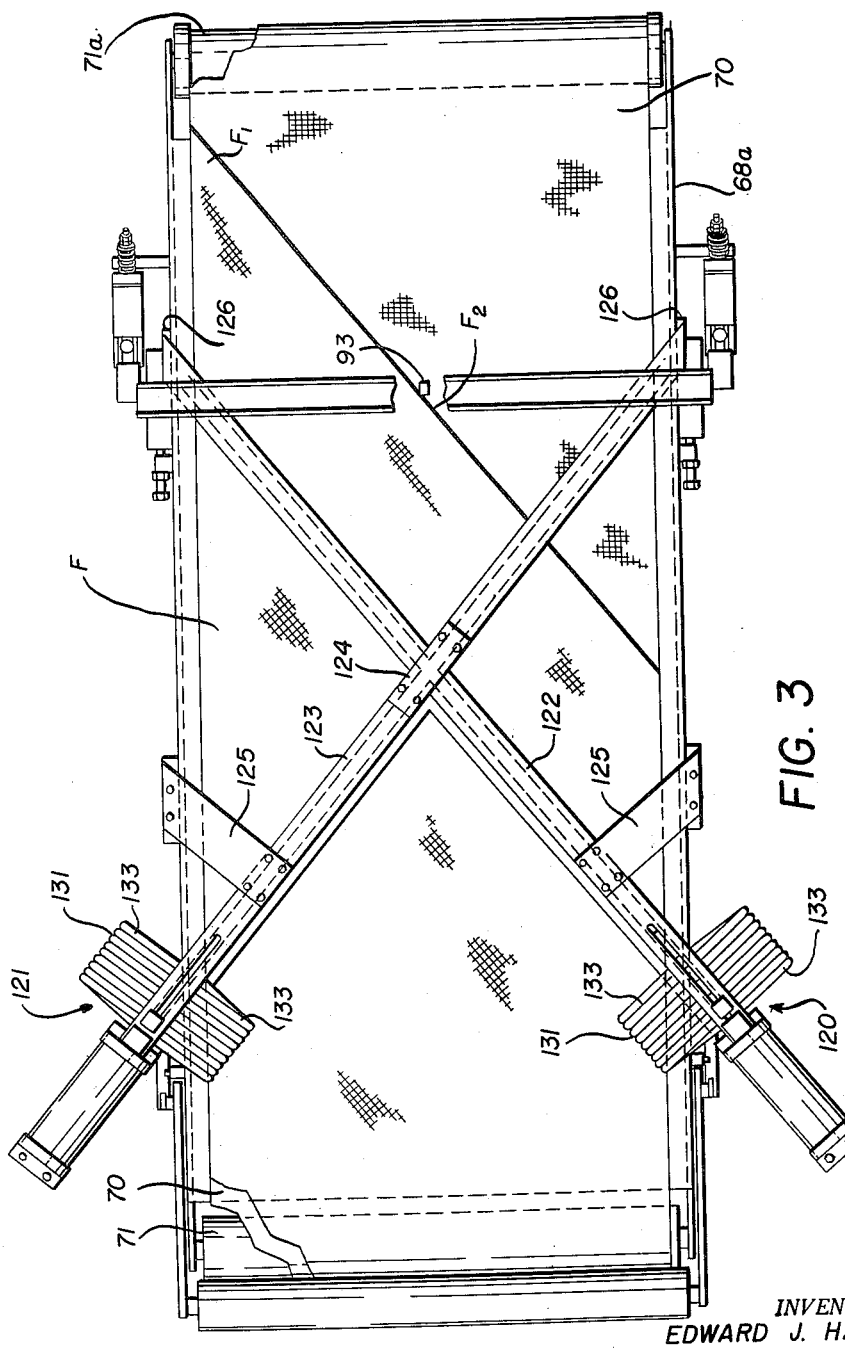
Figure 3 is a view taken on the lines 3—3 of Figure 1.
Figure 4:
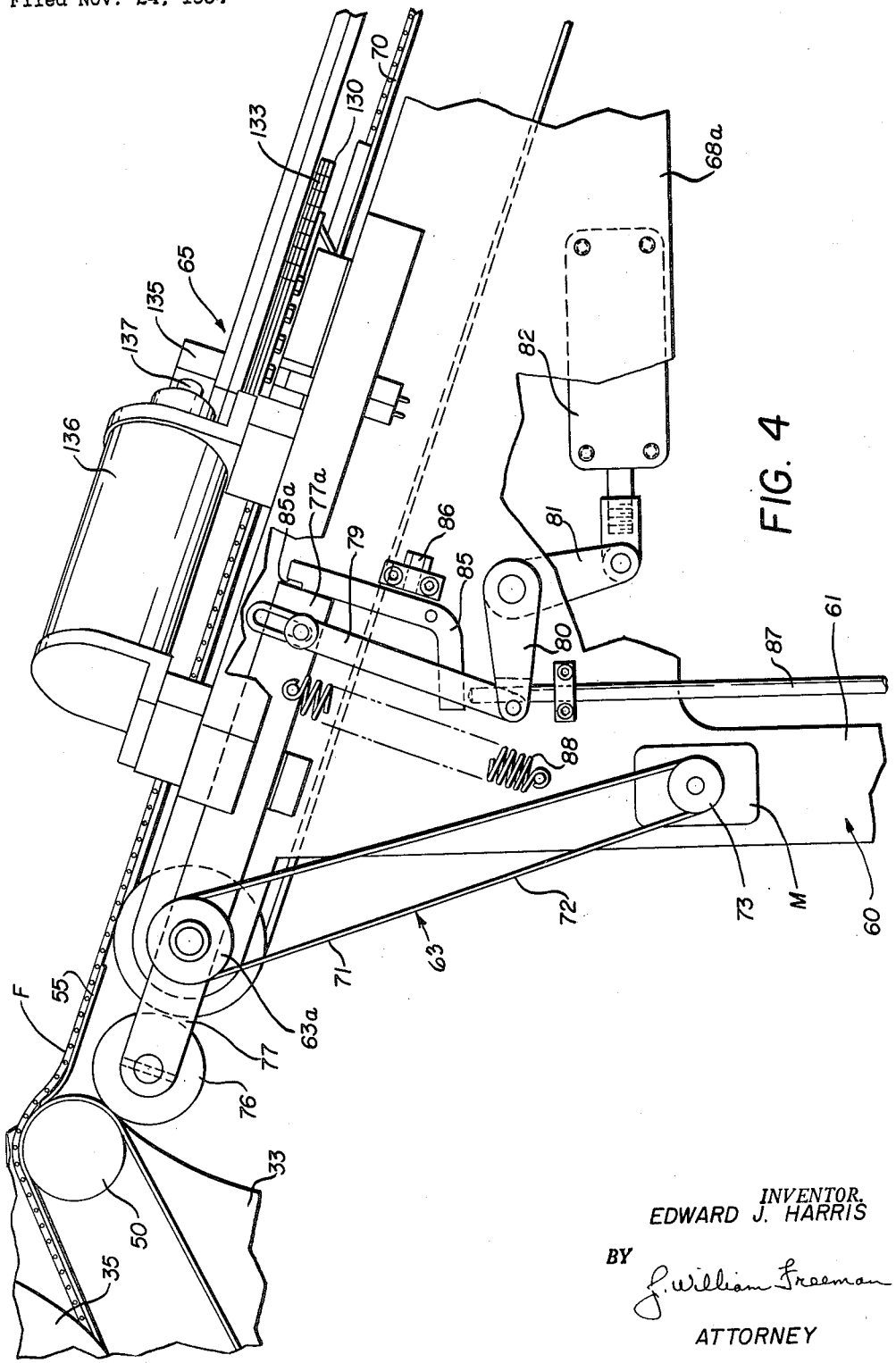
Figure 4 is an enlarged elevational view showing in greater detail one portion of the ply feeding mechanism of the improved servicer.
Figure 5:
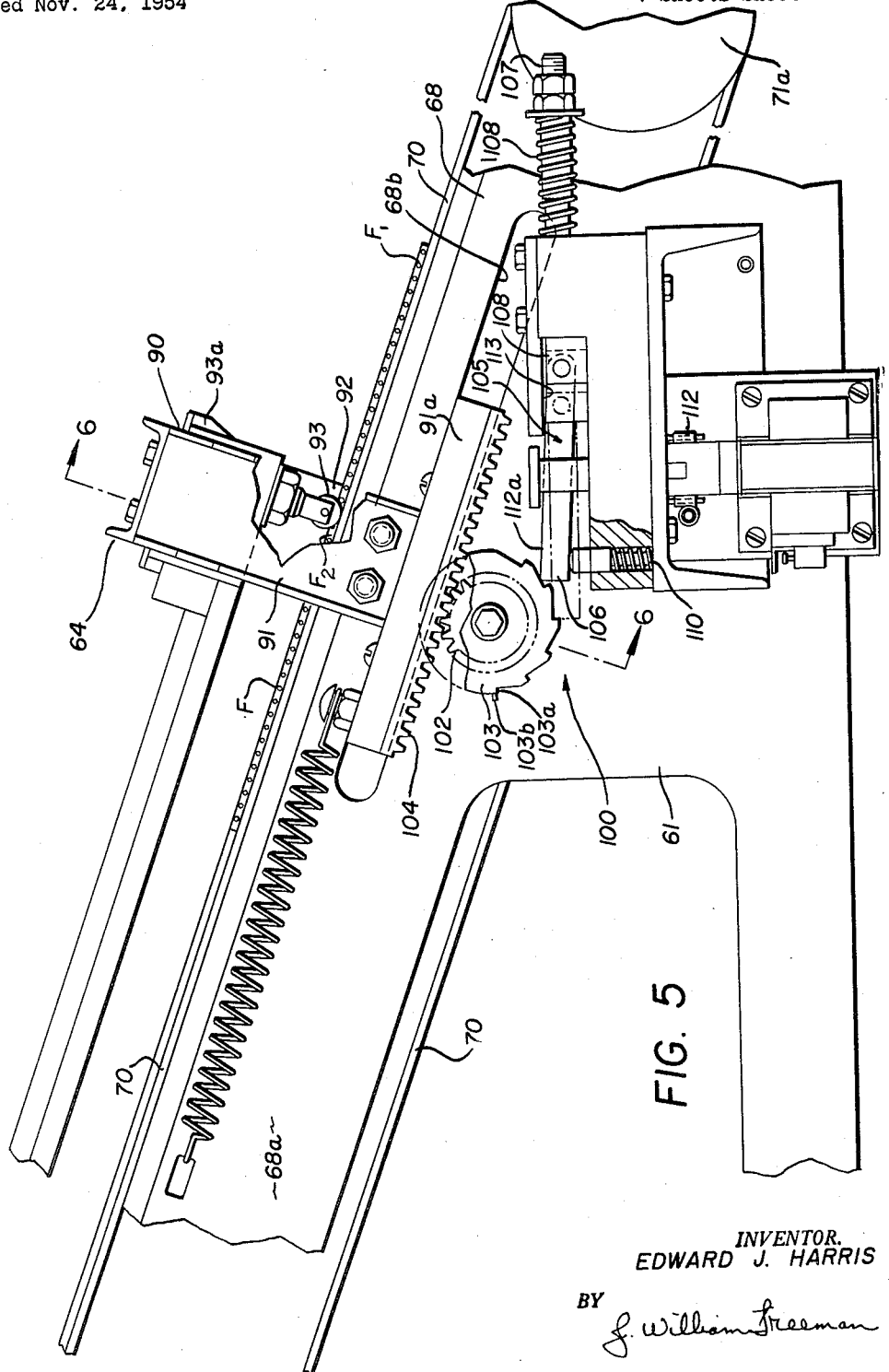
Figure 5 is an enlarged elevational view of another component element of the ply feeding mechanism of the improved servicer.

Accordingly, in Figures 3, 4 and 5 the conveyor 62 is shown as including an endless belt 70 that is received over rolls 71 and 71a provided at longitudinally spaced points on the inclined surface 68 of the carriage frame 60, and being arranged so that the belt 70 can be moved through its endless path by the driving means 63.

The driving means 63 includes a sheave 63a, provided on one axial end of the roll 71 and being designed for reception thereon of a driving belt or chain 72 that is also mounted around a drive pulley 73 of a motor M (see Figure 4). In this manner, rotation of the motor M results in similar rotation of the roll 71 to thus cause movement of the conveyor belt 70 around the rolls 71 and 71a. This rotation of the roll 71 additionally results in rotation of a friction wheel 76 that has the axial ends thereof rotatably carried by a link arm 77 that is pivoted about the axis of the roll 71 (see Figure 4) The opposed free end 77a of the link 77 is shown secured to a link 79 that operates to reciprocate the link 77 about its pivot point as the same is defined by the axis of the roll 71, this reciprocatory movement resulting from equivalent movement of Pitman arms 80, 81 that interconnect the link 79 with a piston 82. In this manner, movement to the left of the piston 82 (see Figure 4) results in the friction wheel being moved vertically downward, so that the same is disengaged from its point of driving contact with the idler roll 50. The wheel 76 is maintained in this retracted position with respect to the idler roll 50 by the action of a crank arm 85 that is spring loaded as at 86, and additionally is provided with a notched end 85a thereof that is engageable with the free end 77a of a link 79 when the same (end 77a) is moved upward by the just described expansion of the piston 82.

The wheel 76 may be released from this out-of-contact relationship with the idler roll 50 by the vertical movement of a bumper rod 87 that is operable to pivot the crank arm 85 so as to break the contact between the link end 77a and the notched end 85a, whereby the wheel 76 will be returned to the position of Figure 4 by the action of the spring 88. It is manifest in this regard, that the actuation of the bumper rod 87 may be timed to the movement of the carriage 60 with respect to the frame 27 by equipping the slides 27b, 27b with cam surfaces (not shown) that cause lifting of the bumper rod 87 upon contact therewith.

Figure 6:
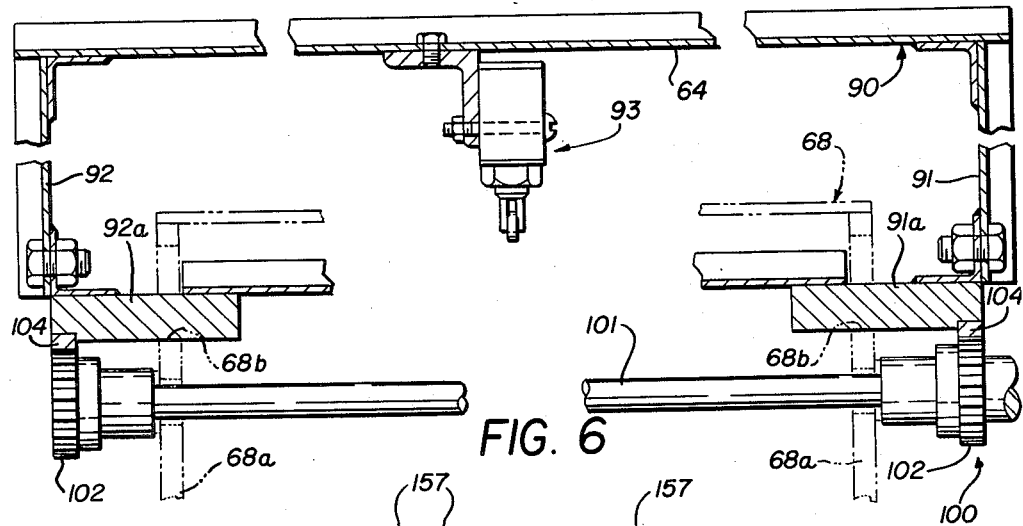
Figure 6 is a section taken on the lines 6—6 of Figure 5.

The measuring means 64, illustrated best in Figures 5 and 6 of the drawings, include a U-shaped framework 90, having the free ends of leg members 91 and 92 slidingly received through guide slides 91a, 92a, in a longitudinal cutout 68b that is provided in the framework 68a of the inclined surface 68. Depending downwardly adjacent the central portion of the U-shaped framework 90 there is illustrated a solenoid switch 93 of known construction, that is positioned just out of contact with the conveyor belt 70, the arrangement being such that advancing fabric ply F received on belt 70 will contact the switch 93 with the result that the same, being electrically connected to motor M (see Figure 4) will cause the motor M to stop and thus result in cessation of the movement of the belt 70. While the switch 93 may be moved transversely of the framework 90 as the result of the base 93a of the switch 93 being slidably mounted on the framework 90 (see Figure 6), the switch 93, together with the framework 90, is shown movable longitudinally with respect to the framework 68a by index means generally designated as 100, that operate on a ratchet and pawl arrangement, to be described.

To this end, the framework 68a is shown as seating the axial ends of a shaft 101 that carries, at axially spaced points, a pinion 102 and a ratchet wheel 103 that respectively engage a gear rack 104 provided on framework 90, and detent means 105, carried by the carriage frame 60. The detent means 105 includes a pawl 106 that is tensionally urged between the full and chain-dotted positions of Figure 5 by the reciprocatory movement of a shaft 107 that is carried in a slot 113 of a block 114; the arrangement being such that a slide guide 108, provided on one end of shaft 107 is normally maintained in the full line position of Figure 5 by a spring 109, with the result that the pawl 106 is pivoted to the slide guide 108 and maintained in the full line position by a spring 110.

While the above arrangement of component parts will operate to effectuate indexing one notch of the ratchet wheel 103 upon axial movement to the left (Figure 5) of shaft 107, the detent means 105 also includes reset provisions whereby a ratchet notch 103a may be moved clockwise so as to return to a starting point of contact with the pawl 106, as for example, at the beginning of construction of a new tire requiring a shorter longitudinal length of fabric ply F.

Accordingly, the guides 91a and 92a are shown secured to one end of a coil spring 111 that has the opposed free end thereof secured to the framework 68a (see Figure 5). The effect of such a spring 111 is to create a clockwise rotational force in the pinion 102 and the ratchet wheel 103 that is resisted by the engagement between the pawl 106 and the ratchet wheel 103. This engagement may be broken for the purpose of releasing the clockwise force created in the ratchet wheel 103 by merely depressing the head 112a of a solenoid 112 against the pawl 106, with the result that the same (pawl 106) is pivoted about slide guide 108 against the force of spring 110 so as to be out of contact with the ratchet wheel 103 which is then free to rotate clockwise until the abutment 103b strikes the depressed pawl 106, at which time a new cycle of operations may begin.

The cutoff means 65 have been previously indicated as being operable to effectuate a bias cutting of fabric ply F received on the conveyor belt 70. As is best illustrated in Figures 3 and 7 to 10 inclusive, this cutoff operation is performed by opposed cutter knife mechanisms 120 and 121 that are respectively disposed adjacent the spaced edge portions of the conveyor belt 70. Each cutter knife mechanism 120, 121 is shown directed in its cutting path by respective guide frames 122, 123 that intersect as at 124 to define an X-shaped framework that is supported on the opposed frameworks 68a, 68a by tie plates 125, 125 and bolts 126, 126 (see Figure 3).

Turning now to Figure 7 to 10, inclusive, for a detailed description of one representative cutter knife mechanism 120, it will be seen that the same includes a thin knife edge 130 carried in a block 130a that is reciprocal within the keyway 122a of the guide frame 122 upon the expansion or contraction of a scissors-type linkage 131. This scissors-type linkage 131 is of known type wherein any one link arm is pivotally connected at its opposed ends and at its center, to three separate link arms that move in parallelism with respect to each other. In this case the scissors-type linkage 131 includes a series of slide blocks 132, 132 that are slidingly received in the keyway 122a so as to interconnect the central juncture point of the link arms 133, 133 (see Figure 7). Additionally, an actuator block 135 is provided for the purpose of interconnection with a piston 136, the axial displacement of the piston rod 137 thereof serving to expand and contract the scissors-type linkage 131 within the limits defined by the slot 122b of frame 122.

As best shown in Figure 7, the representative cutter knife mechanism 120 is carried on a side frame extension 138 of the frame-work 68a. This extension 138 includes a circular boss 139 having received therein a liner 139c that guides the axial movement of a hold-down clamp 140 that serves to increase the efficiency with which fabric stock F may be cut by the knife 130. This clamp 140, which may be axially actuated by a timed solenoid mechanism (not shown) is defined by a vertical (Figure 7) member 141 that has one end thereof connected to a horizontally extending plate 142, the free end of which receives spaced rods 143, 144 that extend outwardly from the plate 142 on opposite sides of the knife 130, so as to overlay the edge portions of fabric ply F when the same is positioned on the conveyor belt 70. As best illustrated in Figure 10, the rod 143 is elevated slightly over the rod 144 in order to accommodate the use of an inclined ramp 145 provided to insure more efficient bias cutting.

Referring now to Figures 1 and 12 of the drawings, the transfer drum 66 is shown mounted on the link arm 29 so as to be pivotally urged between the full and chain-dotted line positions of Figure 1 by a piston 29a.

The transfer drum 66 per se is shown as being defined by a cylindrical shell 150, that has opposed end walls 151, 151, that support an axial shaft 152, the free ends of which are journaled in the usual roller bearings 153, 153 for rotational reception with one end of the links 29, 29 (see Figure 12). In the preferred embodiment of the invention illustrated in Figure 1, rotational movement of the drum 66 about the bearings 153, 153, is shown accomplished only upon selective contact with either the belt 70 or the rotatable building form 16; and accordingly no independent drive means is employed in this regard, although it is manifest that such a driving device could be employed if desired.

Provision is made, however, for stopping the free rotational movement of the drum 66 at any predetermined point with respect to the link 29 at the end of each cycle of operation, and to this end the shaft 152 is shown provided with a flat surface 152a (see Figure 13) that is engaged by a spring loaded shaft 155 that operates to prevent free rotational movement of the drum 66 about the link 29. In this regard, it is believed apparent that when the drum 66 is being driven by either the belt 70 or the form 16, the rotational force created by this contact will be sufficient to overcome the stopping force exerted as a result of the contact between the flat surface 152a and the shaft 155, as well as the rotational force afforded by the counterweight 156 (see Figure 1).

For the purpose of controlling the adherence of the fabric ply F to the external surface 150a of the shell 150 as desired, the same (shell 150) is provided with a plurality of apertures 157, 157 that serve as port openings for the air chamber 158 that is defined interiorly of the shell 150. Thus, air supplied under pressure, through a conventional fitting (not shown) to the chamber 158 may aid in removing fabric ply F from the external surface 150a for subsequent application to the form 16. Similarly, the air may be exhausted from the chamber 158 to cause a suction force to be applied through apertures 157, 157 so that the fabric ply F may be adhered to the surface 150a.

Additionally, the rotational movement of the drum 66 about links 29, 29 is shown indirectly controlled by the use of a solenoid switch 160 provided on end wall 151 and being engageable with an abutment 161 provided on the link 29. This switch 160 is electrically connected to the motor M with the result that contact between switch 160 and abutment 161 operates to interrupt the operation of motor M thus resulting in cessation of movement of the belt 70 and the drum 66 frictionally engaged therewith.

*Operation of the servicer*

In use or operation of the improved servicer 10, for supplying predetermined lengths of fabric ply F to the building form 16 of the pneumatic tire machine 11, the servicer 10 is first moved on the tracks 21, 21 so that the same is aligned adjacent the center portion of the tire building machine 11. In this position, the machine may be secured in place by the use of blocks (not shown) which will serve to obviate any movement of the wheels 20, 20 on the tracks 21, 21 during the period of operation thereof.

With the servicer 10 positioned as just described, fabric stock F may be supplied to the stock carrying unit 15 from an independent source S, positioned adjacent loading station E. This loading of the individual fabric rolls 35, 35 is effectuated by virtue of engagement between the drive friction wheel 170 (see Figure 1) and the driving wheel 53 that is carried on the shaft 36 of the stock roll 35.

When the individual stock rolls 35, 35 have been completely filled with fabric ply, as just described, the dispensing of predetermined lengths of fabric ply may be commenced by moving one stock roll 35 into the unloading station U by use of the indexing means (not shown). (See Figure 1). With the stock roll 35 positioned in the unloading station U as just described, the ply feeding mechanism 14 may be moved into engagement with the stock carrying unit upon actuation of the piston 66C which operates to move the carriage frame 60 along the slide guides 27b, 27b of the bed frame 27. When contact is established between the ply feeding mechanism 14 and the stock carrying unit 15, the stock may be dispensed from the roll 35 by initiating rotational movement of the conveyor belt 70 as the result of turning on the motor M. This movement of the conveyor belt 70 will result in rotational movement of the friction wheel 76, that will in turn engage the liner L that is applied over the idler roll 50. As a result of the counter-clockwise movement of the friction wheel 76, the idler roll 50 will be moved in a clock-wise direction (see Figure 1), with the result that fabric F and liner L will be simultaneously drawn off the lowermost portion of the stock roll 35. This drawn-off material will then be separated by the splitter 55, so that the liner L will travel rearwardly over the roller 51 for reception on the stock roll 34; while the fabric F will be directed towards the conveyor belt 70, the tape 49 serving to wind up the roll 34 during this period. At this point, it will be assumed that the free end of the fabric ply F has been previously severed on a bias angle, and accordingly, has the extreme tip end $F_1$ positioned as shown in Figure 3; with the result that this advancing tip end $F_1$ will not be engaged by solenoid switch 93. Accordingly, the fabric ply F will not contact the solenoid switch 93 until a central edge portion $F_2$ comes into contact with the same. When such contact does occur, as indicated, this contact will cause the motor M to be stopped, with the result that the rotational movement of the endless conveyor belt 70 will similarly stop.

At this point, the transfer drum 66 may be moved into contact with the free tip end $F_1$ of the fabric ply F that is received on the belt 70 (see Figure 3), and re-energization of the motor M will result in further movement of the belt 70. At such time as this re-energization occurs, the tip end $F_1$ of the fabric ply F will be transferred into adherence against the external surface 150a of the transfer drum 66, and the rotational advancement of the transfer drum 66 about the link 29 will result in additional fabric F being transferred to the drum 66, until such time as the limit switch 160 strikes an abutment (not shown) provided on link 29. At this point of contact, the motor M will stop and the severance of the proper length of fabric ply F may be commenced.

To this end, at this time the solenoid switch (not shown) of the hold-down clamp 140 may be energized to lower the rods 143 and 144 into contact with the fabric ply F; and subsequently, the piston 136 may be actuated to cause the scissors-type linkage 131 to move the knife edge 130 transversely across the fabric ply F to effectuate a bias cutting of fabric F. Upon return of the cutter knife 130 when the scissors-type linkage 131 is contracted to the position shown in Figure 3, the solenoid switch (not shown) of the hold-down clamp 140 may be de-energized and the rods 143, 144 moved upwardly out of contact with the fabric ply F.

At this stage of operation, a predetermined length of fabric ply has been cut on a proper bias angle, and accordingly, the friction wheel 76 may now be moved out of contact with the idler roll 50 by actuation of the piston 82 (see Figure 4) that results in movement of the link arm 77 through the Pitman arms 80 and 81; it being understood that the notched end 85a of the crank 85 will engage the end 77a of the link 77 to maintain the friction wheel 76 in this out-of-contact position against the force of the spring 88.

Having severed a predetermined length of fabric ply, as just described, this length of fabric ply F may now be applied to the surface 150a of the transfer drum 66 by re-energizing the motor M; whereupon the frictional contact between the fabric ply F and the drum 66 will result in rotational advancement of the drum 66. During this period of rotational movement of the drum 66, the chamber 158 may be exhausted so that a suction force is applied to the underside of the fabric ply F through the apertures 157, 157, to thus aid in holding the same on the external surface 150a of the drum 66.

When the entire length of fabric ply F has been wound around the drum 66, as just described, the drum 66 may be moved from the chain-dotted position of Figure 1 to the full line position of Figure 1 by expansion of the piston 29a that operates to move the link arm 29 around the trunnion 28. When the drum 66 is in the full line position of Figure 1, the fabric ply F contained thereon may be applied to the building form 16 merely by rotating the same; it being understood that air pressure could be applied interiorly of the chamber 158 to aid in this regard.

At such time as the entire length of fabric ply F has been applied about the circumference of the building form 16, the transfer drum 66 may be moved out of contact with the building form 16 by partial compression of the piston 29a, it being apparent that the free rotational movement of the drum 66 will come to a stop at the same point in each case, due to the engagement between the flat surface 152a and the bumper rod 155 (see Figures 12 and 13).

When the transfer drum 66 has been moved upwardly and out of contact with the building form 16, the ply feeding mechanism 14 may be moved longitudinally to the right (Figure 1) of the bed frame 27 by actuating the piston 66. In this manner, the friction wheel 76 will be moved to the right so as to be out of the peripheral path of movement of the idler roll 50, with the result that indexing means (not shown) can be brought into play to move the next fabric stock roll 35 into the unloading station U for repetition of the above cycle. During this period of movement to the right of the carriage 60, it is manifest that the bumper rod 87 will strike the cam surfaces provided on the guide slides 27b, 27b, and the friction wheel 76 will be released from its depressed condition and will resume the position shown in Figure 4, as a result of the action of the spring 88. Similarly, this lateral movement of the ply feeding mechanism 14 to the right will also result in the shaft 107 being struck by an abutment (not shown) to cause the ratchet wheel 103 to be rotated counterclockwise (see Figure 5) one notch, and thus move the solenoid switch 93 further downward and to the right of the inclined surface (see Figure 5). In this indexed position, a longer length of fabric ply F will be dispensed during the next cycle of operation, due to the increased distance the same may travel before striking the solenoid switch 93. During the previously described indexing operation, it is manifest that windup means (not shown) may be utilized to engage the friction wheel 53 provided on one axial end of the shaft 36, with the result that the severed end presented to the left of the cutoff means (see Figure 4) may be wound up onto the stock roll 35. When the next stock roll 35 has been positioned in the unloading station U, as just described, the carriage 60 may be moved to the left of Figure 1 for re-establishment of contact between the ply feeding mechanism 14 and the stock carrying unit 15 so that a second, somewhat longer, length of fabric ply can be dispensed in the manner just described.

It is to be noted that if it is desired to reset the location of the solenoid switch 93 at any time during the overall cycle of operation involved in building a pnuematic tire, that this resetting may be accomplished by merely energizing the solenoid switch 112 (see Figure 5) whereby the head 112a will be depressed so as to move the pawl member 106 downwardly against the force of the spring 110, and thus permit clearance between the pawl member 106 and the various notches of the ratchet wheel 103.

It will be seen from the preceding paragraphs that there has been provided a new and novel type of servicing equipment for pneumatic tire building machines that is operable to dispense predetermined lengths of fabric ply around the building form of a penumatic tire machine. It has been further illustrated how this improved servicing mechanism is operable to dispense successively longer strips of fabric ply F so that the increased circumference required after previous applications of fabric plies can be provided. It has been further illustrated how a transfer drum 66 has been employed to minimize the length requirements of the overall conveyor belt 70, with the result that a conveyor belt having a span considerably less than the overall length of the fabric ply may be satisfactorily employed.

During the preceding paragraphs, general reference has been made to certain known prior art mechanisms conventionally employed for known purposes. Exemplary of this class are the use of solenoid switches that are employed throughout the construction of this servicing machine 10, to effectuate a new and novel timing result. It is to be specifically understood, however, that the scope of this invention is not limited to the representative embodiment set forth in the preceding specification.

Accordingly, modifications of the invention may be resorted to without departing from the spirit thereof or the scope of the appended claims.

What is claimed is:
1. A servicer for pneumatic tire machines, comprising; a frame; a circular support rotatably carried by said frame;

a plurality of stock rolls arranged in a circular course around the axis of said support; a corresponding number of liner rolls arranged in a circular course about the axis of said support and being positioned between said axis and said stock rolls; means operable between each stock roll and its corresponding liner roll whereby rotational movement of said stock roll will result in reversed rotational movement of said liner roll; a loading zone, defined by said frame and being disposed adjacent one peripheral edge portion of said circular support; an unloading zone, positioned adjacent one arcuately disposed peripheral edge portion of said support; winding means on said frame for initiating rotational movement of a stock roll positioned in said loading zone; arcuately spaced unwinding means on said frame operable to initiate reversed rotational movement of a stock roll positioned in said unloading zone; withdrawing means adjacent said unloading zone for withdrawing, severing, and supporting a predetermined length of fabric ply from a stock roll positioned in said unloading zone and transfer means provided adjacent said withdrawing means for transferring said withdrawn, severed length of fabric ply from said withdrawing means to said tire machine said transfer means including a rotatable drum pivoted to said frame and being movable between said unloading zone and said withdrawing means.

2. A servicing machine for pneumatic tire building equipment, comprising; a stock carrying unit having a plurality of stock roll supports for carrying fabric ply stock rolls thereon; a stock feeding device positioned adjacent said stock carrying unit, including; a carriage; an endless conveyor supported by said carriage and defining a fabric ply receiving surface; a transfer drum carried by said carriage and having the external surface thereof movable into and out of contact with said fabric ply receiving surface whereby fabric ply received on said conveyor may be transferred to the external surface of said drum upon contact between said drum and said conveyor; and means for transferring fabric ply from one said stock roll carried by said stock carrying unit to said stock feeding device.

3. A servicing machine for pneumatic tire building equipment, comprising; a stock carrying unit having a plurality of stock roll supports for carrying fabric stock rolls thereon; a stock feeding device positioned adjacent said stock carrying unit and including; a carriage; an endless conveyor supported by said carriage and defining a fabric ply receiving surface; a transfer drum carried by said carriage and having the external surface thereof movable into and out of contact with said fabric ply receiving surface whereby fabric ply received on said conveyor may be transferred to the external surface of said drum upon contact between said drum and said conveyor; and means for withdrawing a predetermined length of fabric ply from said stock roll carried by said stock carrying unit and transferring the same to said fabric ply receiving surface of said stock feeding device.

4. A servicing machine for pneumatic tire building equipment, comprising; a stock carrying unit having a plurality of stock roll supports for carrying fabric stock rolls thereon; a stock feeding device, positioned adjacent said stock carrying unit and including; a carriage; an endless conveyor supported by said carriage and defining a fabric ply receiving surface; means for dispensing fabric ply from at least one said stock roll to said ply receiving surface, a transfer drum carried by said carriage and having the external surface thereof movable into and out of contact with said fabric ply receiving surface whereby fabric ply received on said conveyor may be transferred to the external surface of said drum upon contact between said drum and said conveyor; and at least one angularly disposed cutoff means operable to transversely sever fabric ply received on such conveyor.

5. A servicing machine for pneumatic tire building equipment, comprising; a stock carrying unit having a plurality of stock roll supports for carrying fabric stock rolls thereon; a stock feeding device, positioned adjacent said stock carrying unit, and including; a carriage; an endless conveyor supported by said carriage and defining a fabric ply receiving surface; a transfer drum carried by said carriage and having the external surface thereof movable into and out of contact with said fabric ply receiving surface whereby fabric ply received on said conveyor may be transferred to the external surface of said drum upon contact between said drum and said conveyor; means for transferring a fabric ply from one said stock roll carried by said stock carrying unit to said ply receiving surface of stock feeding device; at least one angularly disposed cutoff means operable to transversely sever said fabric ply received on said conveyor; and means for varying the length of fabric ply withdrawn and severed by said cutoff means.

6. A servicer for pneumatic tire machines, comprising; a stock carrying unit; and ply feeding means operable to withdraw a predetermined amount of fabric stock from a fabric stock roll carried by said stock carrying unit; said stock carrying unit including; a frame; a circular support rotatably carried by said frame; a plurality of stock rolls arranged in a closed cyclic path around the axis of said support; a loading zone positioned adjacent one peripheral edge portion of said circular support; an unloading zone positioned adjacent an arcuately disposed peripheral edge portion of said circular support; winding means on said frame for initiating rotational movement of one said stock roll positioned in said loading zone; arcuately spaced unwinding means, operable to initiate reversed rotational movement of the stock roll positioned in said unloading zone; and said ply feeding mechanism, including; a frame; a conveyor carried by said frame and being capable of receiving fabric withdrawn from said stock roll positioned in said unloading zone; and a transfer drum pivotally mounted on said frame and being pivotal about said frame into and out of engagement with said conveyor, whereby fabric received on said conveyor may be transferred to the external surface of said drum upon rotation of said drum and said conveyor during periods of engagement therebetween.

7. A servicing machine for pneumatic tire building equipment, comprising; a stock carrying unit; and a ply feeding means operable to withdraw a predetermined amount of fabric stock from one fabric stock roll carried by said stock carrying unit; said stock carrying unit including; a frame; a circular support rotatably carried by said frame; a plurality of stock rolls arranged in a closed cyclic path around the axis of said support; a loading zone positioned adjacent the peripheral edge portion of said circular support; an unloading zone positioned adjacent one edge portion of said circular support; winding means on said frame for initiating rotational movement of one said stock roll positioned in said loading zone; arcuately spaced unwinding means on said frame operable to initiate reversed rotational movement of one said stock roll positioned in said unloading zone; and said ply feeding means including; a frame; a conveyor carried by said frame and being capable of receiving fabric withdrawn from said stock roll positioned in said unloading zone; a transfer drum carried by said frame and being shiftable into and out of engagement with said conveyor, whereby fabric received on said conveyor may be transferred to the external surface of said drum upon rotation of said drum and said conveyor during periods of engagement therebetween; cutoff means movable transversely across said conveyor, whereby fabric ply received on such conveyor may be transversely severed; a switch member engageable by advancing fabric carried on said conveyor, whereby movement of said conveyor stops upon engagement between said fabric ply and said switch; and means for adjusting the location of said switch longitudinally of said conveyor, whereby the length of fabric ply received on said conveyor during one period of operation may be varied.

8. The device of claim 6 further characterized by the fact that said drum is provided with at least one aperture, whereby the application of suction pressure to the interior of said drum will increase the inherence of said fabric to the external surface thereof.

9. A servicing machine for pneumatic tire building equipment, comprising; a frame; a stock carrying unit supported by said frame and having a plurality of stock rolls rotatably supported thereon in a closed cyclic path; a carriage having a movable belt provided thereon; means for transferring a predetermined length of fabric ply from one said stock roll to said movable belt; a rotatable drum pivoted to said frame having its external surface movable into and out of contact with said movable belt whereby fabric ply received on said movable belt may be transferred to said external surface of said drum upon rotation thereof while in contact with said movable belt.

10. A servicing machine for pneumatic tire building equipment, comprising; a frame; a stock carrying unit supported by said frame and having a plurality of stock rolls rotatably supported thereon in a closed cyclic path; a carriage having a movable belt; means for transferring a predetermined length of fabric ply from at least one stock roll to said movable belt; a rotatable drum pivotably mounted to said frame and having its external surface movable into and out of contact with said movable belt whereby fabric received on said movable belt may be transferred to said external surface of said drum upon relative movement between said drum and said movable belt while the same are in contact with each other.

11. A servicing machine for pneumatic tire building equipment, comprising; a frame; a stock carrying unit supported by said frame and having a plurality of stock rolls supported rotatably thereon in a closed cyclic path; a carriage having a movable belt; means for feeding stock from at least one said stock roll onto said movable belt; means for severing said stock transferred onto said movable belt into a predetermined length; a rotatable drum pivotably mounted to said frame and having its external surface movable into and out of contact with said movable belt whereby fabric received on said movable belt may be transferred to the external surface of said drum upon relative movement between said drum and said movable belt while the same are in contact.

References Cited in the file of this patent

UNITED STATES PATENTS

| | | |
|---|---|---|
| 2,259,162 | Hirsch et al. | Oct. 14, 1941 |
| 2,441,791 | Bostwick | May 18, 1948 |
| 2,487,196 | Sternad et al. | Nov. 8, 1949 |
| 2,517,889 | Kuffler | Aug. 8, 1950 |
| 2,521,728 | Kastner | Sept. 12, 1950 |
| 2,558,903 | Kastner | July 3, 1951 |
| 2,588,207 | Cleland et al. | Mar. 4, 1952 |
| 2,665,757 | Stevens et al. | Jan. 12, 1954 |
| 2,668,572 | Bostwick | Feb. 9, 1954 |